United States Patent
Kowalevicz et al.

(10) Patent No.: US 10,243,735 B2
(45) Date of Patent: Mar. 26, 2019

(54) DEVICE AND METHOD FOR MODULATED WAVEFORM ENCRYPTION

(71) Applicant: Raytheon Company, Waltham, MA (US)

(72) Inventors: Andrew Kowalevicz, Arlington, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 319 days.

(21) Appl. No.: 14/950,575

(22) Filed: Nov. 24, 2015

(65) Prior Publication Data
US 2017/0150348 A1 May 25, 2017

(51) Int. Cl.
| | |
|---|---|
| *H04K 1/00* | (2006.01) |
| *H04L 9/08* | (2006.01) |
| *H04L 9/32* | (2006.01) |
| *H04W 12/02* | (2009.01) |
| *H04L 27/20* | (2006.01) |
| *H04L 27/34* | (2006.01) |

(52) U.S. Cl.
CPC .......... *H04L 9/0869* (2013.01); *H04L 9/0816* (2013.01); *H04L 9/3273* (2013.01); *H04W 12/02* (2013.01); *H04L 27/2075* (2013.01); *H04L 27/345* (2013.01); *H04L 2209/24* (2013.01); *H04L 2209/80* (2013.01)

(58) Field of Classification Search
None
See application file for complete search history.

(56) References Cited

U.S. PATENT DOCUMENTS

| | | | | |
|---|---|---|---|---|
| 2006/0062319 A1* | 3/2006 | Kloos | ........... | H04K 1/006 375/264 |
| 2007/0036555 A1* | 2/2007 | Chen | ........... | H04B 10/6165 398/188 |

(Continued)

*Primary Examiner* — Kambiz Zand
*Assistant Examiner* — Arezoo Sherkat
(74) *Attorney, Agent, or Firm* — Schwegman Lundberg & Woessner, P.A.

(57) ABSTRACT

Communication devices and a method of providing secure electronic content are general described. A plainmodulation containing user content is encrypted using a modulation key to form a ciphermodulation having a different magnitude and/or phase than the plainmodulation. Symbol representations of the plainmodulation and ciphermodulation in a QAM constellation are different. The ciphermodulation symbol representation is in a location non-coincident with an expected QAM constellation symbol. The symbol location of different plainmodulations when encypted using different modulation keys may be the same such that the corresponding ciphermodulation symbol representations are co-located. Different modulation keys are used for different plainmodulations, with a modulation key change occurring after transmission of a predetermined number of ciphermodulations and/or time. The modulation key and/or change is transmitted to enable coherent demodulation of the ciphermodulation to be performed. Multiple plainmodulations may be encrypted into a single ciphermodulation and/or a single plainmodulation may be encypted across multiple ciphermodulations.

21 Claims, 6 Drawing Sheets

(56) References Cited

U.S. PATENT DOCUMENTS

| | | | | |
|---|---|---|---|---|
| 2007/0255679 A1* | 11/2007 | Hosoi | ...................... | H04L 9/12 |
| 2008/0101607 A1* | 5/2008 | Liang | ...................... | H04L 9/12 |
| | | | | 380/260 |
| 2015/0326252 A1* | 11/2015 | Bisplinghoff | ......... | H04L 1/0003 |
| | | | | 714/776 |
| 2016/0036607 A1* | 2/2016 | Stephens | .............. | H04L 5/0096 |
| | | | | 375/260 |
| 2016/0212616 A1* | 7/2016 | Allen | ................... | H04W 12/04 |

* cited by examiner

DEVICE AND METHOD FOR MODULATED WAVEFORM ENCRYPTION

TECHNICAL FIELD

Embodiments pertain to providing secure communications. Some embodiments relate to encryption mechanisms and devices that provide encryption.

BACKGROUND

The use of wireless communication systems has become nearly ubiquitous, with an estimated three billion of the world population using the internet and over 60% of those users being provided connectivity through the use of a wireless communication system. In 2015, the Federal Communication Commission (FCC) considered penetration of wireless connectivity into the United States population so prevalent that wireless communications were recently regulated as a utility. With the explosion of wireless usage, however, a number of issues have arisen. One issue has arisen is the security of data, both in transmission of the data as well as storage on the device and elsewhere in the network or other servers. Personal, commercial and financial information routinely traverse various networks. The increased computational power of even relatively small devices may enable brute force attacks to overcome content encryption or provide the ability to acquire the decryption key by another means.

It would be desirable to limit the unauthorized interception and malicious use of communicated content.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
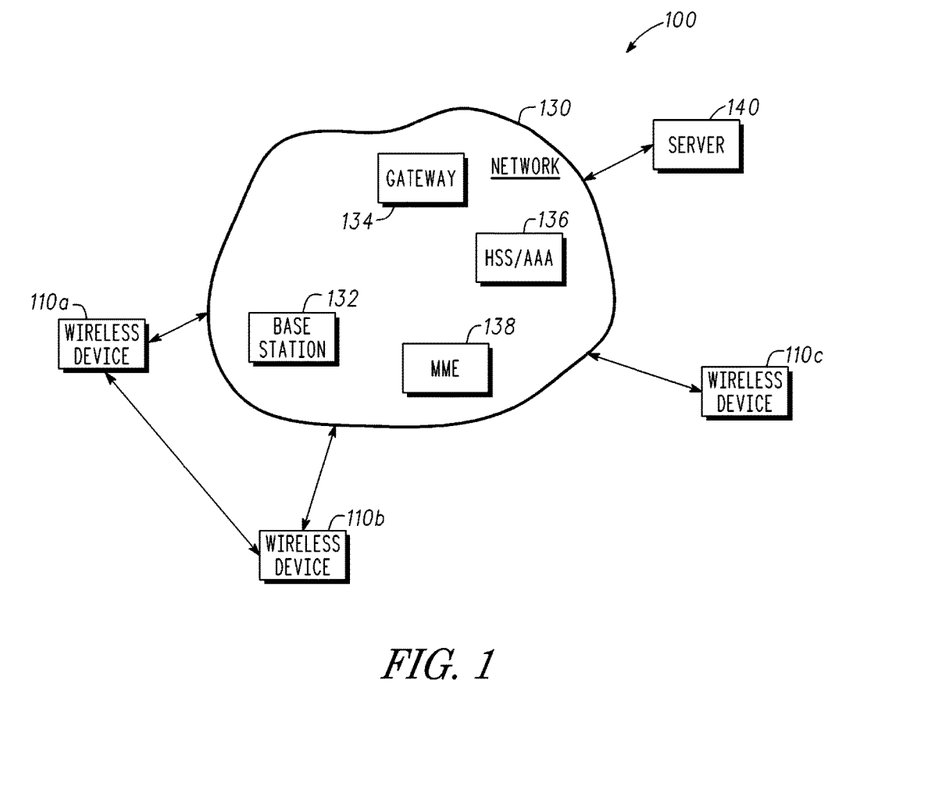
FIG. 1 is a functional block diagram illustrating a communication system in accordance with some embodiments.

FIG. 1 is a functional block diagram illustrating a communication system in accordance with some embodiments. FIG. 1 is a functional block diagram illustrating one embodiment of a network 100 in which wireless devices 110a, 110b, 110c communicate with other wireless devices and/or one or more servers 140. The wireless devices 110a, 110b, 110c may communicate with each other directly or through one or more networks 130. The wireless devices 110a, 110b, 110c may communicate locally, for example, via one or more micro, pico or nano base stations (BSs) or access points (APs) or directly using any of a number of different techniques, such as WiFi, Bluetooth or Zigbee, among others. Alternatively, the wireless devices 110 may also communicate through the network 130 via Third Generation Partnership Project Long Term Evolution (3GPP LTE) networks and LTE advanced (LTE-A) networks, $4^{th}$ generation (4G) networks or $5^{th}$ generation (5G) networks. Examples of wireless devices 110a, 110b, 110c include, but are not limited to, mobile devices such as portable handsets, smartphones, tablet computers, laptop computers, wearable devices, and sensors. The server 140 may provide audio and/or video content or support for applications running on the wireless device 110a, 110b, 110c. Note that although wireless devices are shown in FIG. 1, in other embodiments, some or all of the devices may be wired devices.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each wireless device 110a, 110b, 110c. The HSS 136 may be a database of user (subscriber) information, i.e., customer profiles and provide authentication for use of the network 130 by a particular wireless device 110a, 110b, 110c. The user information may include account information, account status, user preferences, features subscribed to by the user, user's current location, and allowable APNs. The HSS 136 may provide the user profile to a Mobility Management Entity (MME) 138, which controls network access of the wireless devices 110a, 110b, 110c through the gateway 134. The network 130 may also contain various servers that provide content or other information related to user accounts.

During a communication session through a network, whether a local-area network (e.g., WiFi-based) or wide-area network (e.g., 4G-based), a transmitting wireless device 110a may typically transmit a signal using one of a number of wireless protocols, examples of which are provided above. The signal received by a receiving wireless device 110c may have a waveform that permits detection in a static fashion by the receiving wireless device 110c. Devices within physical range of an open, unencrypted wireless network may be able to capture and record the network traffic. This may permit the devices to gain unsanctioned access to internal network resources, and use information and resources therein for illicit purposes. To combat this, the signal may either be hidden or the data of the signal may be encrypted.

Traditional binary bit level encryption converts plaintext (readable data that are used as an input to the encryption algorithm) into ciphertext (encrypted data). The ciphertext is the resultant binary sequence of bits that contain all data to be transmitted, protected by encoding of the encryption algorithm. Various key-exchange based protocols have been developed in which, for example, private keys are exchanged between communicating devices prior to transmission of the encrypted data, public keys are provided during the data transmission and the combination of the public and private keys are used for encryption and decryption by both devices. The data may be encrypted using one of a number of techniques, such the Wired Equivalent Privacy (WEP) encryption standard, the Wi-Fi Protected Access (WPA and WPA2) security protocols, Temporal Key Integrity Protocol (TKIP), or different flavors of the Extensible Authentication Protocol (EAP). The encrypted bit sequence may then be encoded (line coding for digital communication) and transmitted by any of numerous different modulation formats. For a given binary bit sequence, encoding scheme and modulation, however, the transmitted signal will always be the same.

Whether or not the signals are encrypted, any device along the communication path (e.g., near either transmitting wireless device 110a or receiving wireless device 110c) or within range of either the signal transmission or reception location, and that has knowledge of the characteristics of the transmission may also be able to detect, capture and save the signal waveform. Once captured, encryption of the binary bit sequence may delay access, but eventually, the content may be used by an unauthorized party. To combat this issue, other techniques may be used to prevent the signal from being detected. These techniques may include frequency hopping, spread spectrum broadcast and numerous other low probability of intercept or low probability of detection (LPI/LPD) approaches. One or a combination of hiding the signal and encryption of the data may be used, although LPI/LPD approaches may not work well for large bandwidth, high data rate communications, which are becoming increasingly prevalent with the advent of streaming video and other data-intensive applications. Other security mechanisms are thus desirable.

Figure 2:
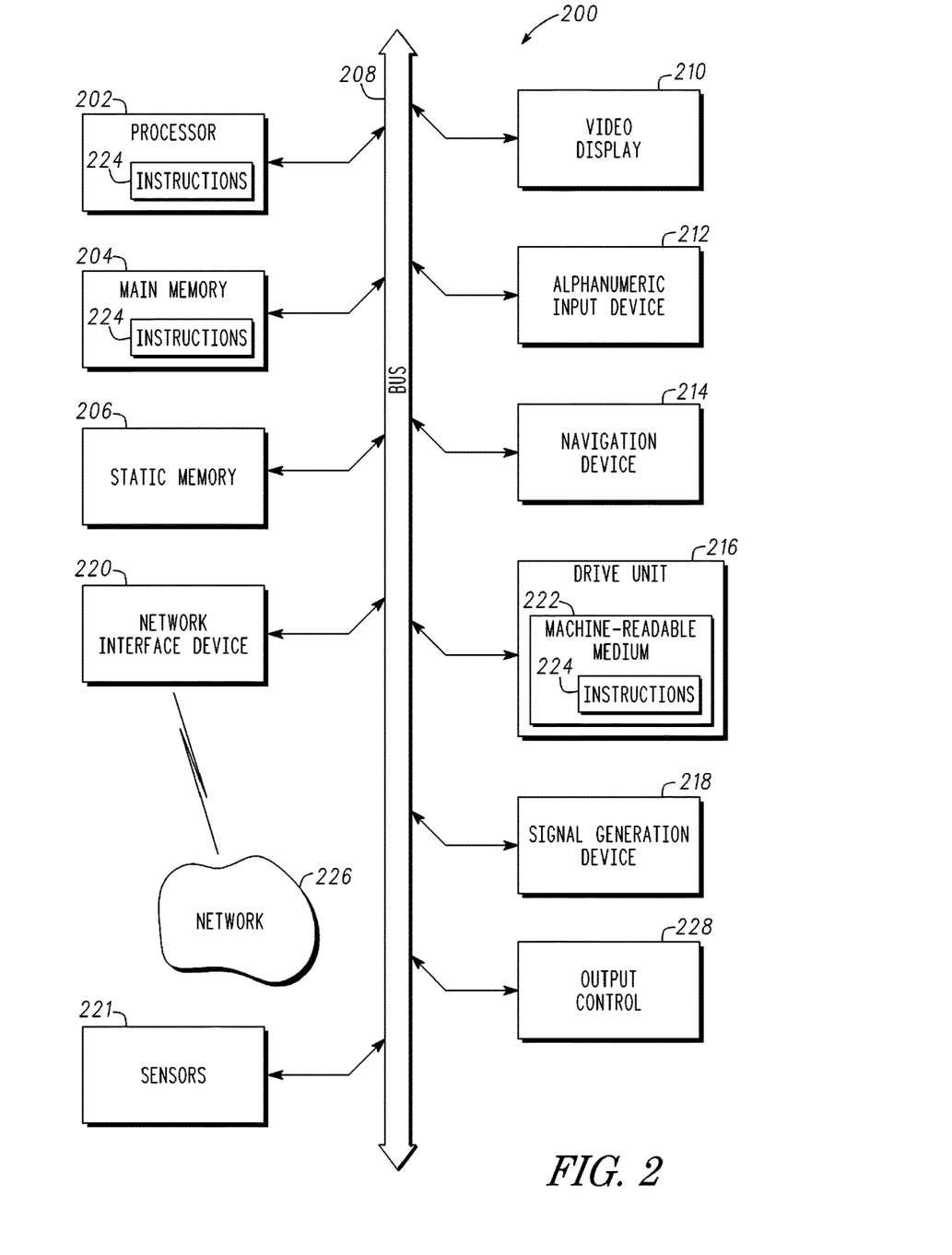
FIG. 2 illustrates a block diagram of a wireless device in accordance with some embodiments.

FIG. 2 illustrates a block diagram of a wireless device in accordance with some embodiments. In some embodiments, the wireless device 200 may be the wireless device shown in FIG. 1, and may be a computer configured to perform any one or more of the techniques during transaction events discussed herein. In alternative embodiments, the wireless device 200 may operate as a standalone device or may be connected (e.g., networked) to other computers. In a networked deployment, the wireless device 200 may operate in the capacity of a server, a client, or both in server-client network environments. In an example, the wireless device 200 may act as a peer machine in peer-to-peer (P2P) (or other distributed) network environment. The wireless device 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The wireless device 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The wireless device 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The wireless device 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The wireless device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the wireless device 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the wireless device 200 and that cause the wireless device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, optical fiber, or phone jacks) or one or more antennas to connect to the communications network 226.

In at least some of the embodiments, encryption of the modulated signal may be performed, analogous to traditional binary bit level encryption. In this case, however, protection of the data may be performed by modifying the modulated signal representation of the binary bits. Table 1 provides terms and definitions for at least some of the described embodiments. A characteristic of modulated waveform encryption is that the binary bit sequence may not uniquely determine the modulated signal; the modulated signal that is transmitted may be modified by a modulation key waveform that may vary one or both of the magnitude or phase from an expected modulated representation.

Figure 3A:
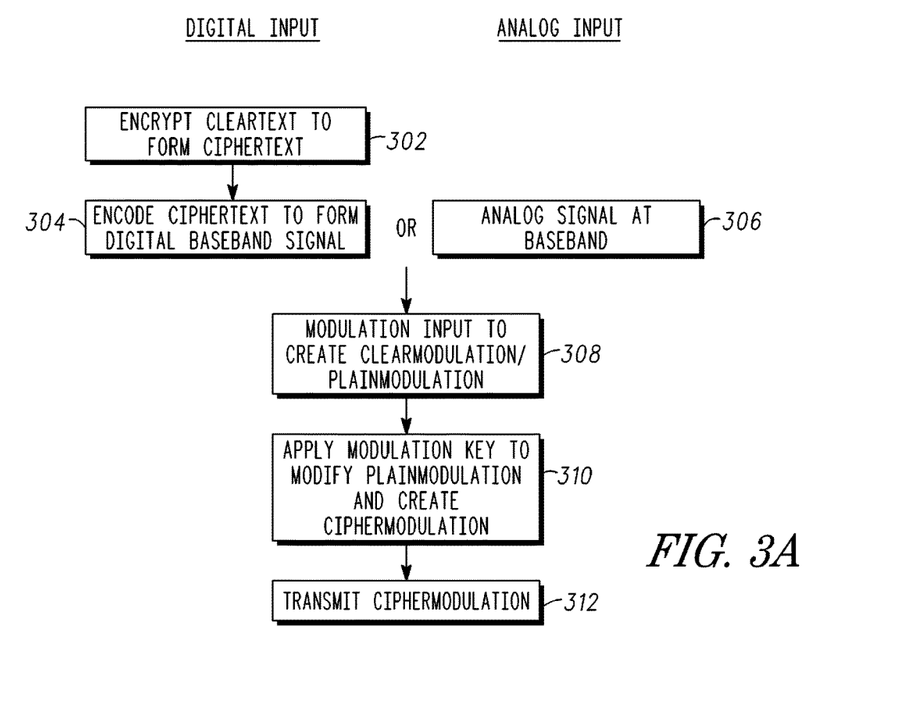
FIGS. 3A and 3B illustrate flowcharts of using coherent detection to protect data from unauthorized capture in accordance with some embodiments.
Figure 3B:
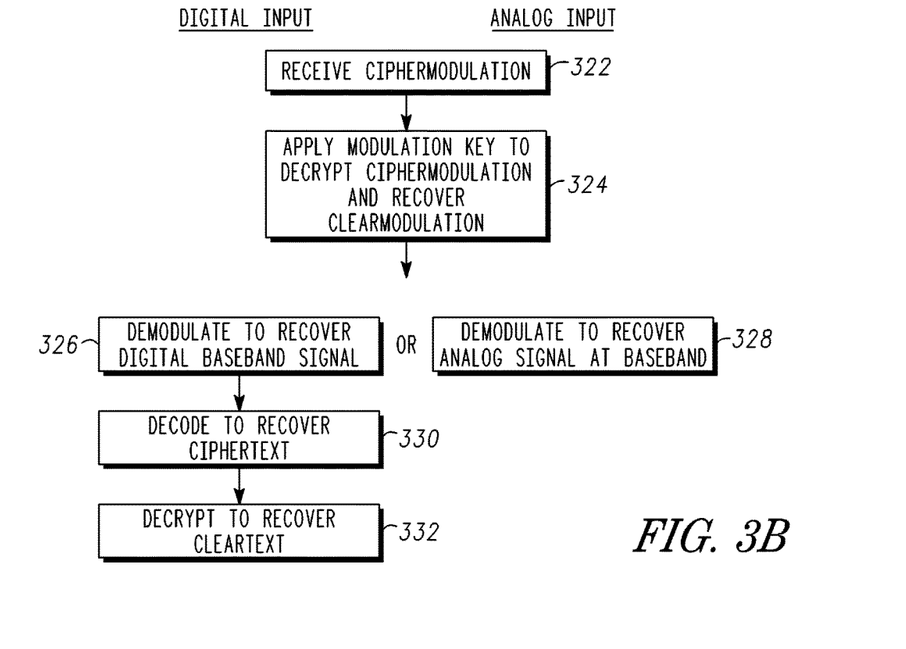

FIGS. 3A and 3B illustrate flowcharts of using modulated waveform encryption to protect data (encrypted at the binary bit level or otherwise) from unauthorized capture in accordance with some embodiments. The process shown in FIGS. 3A and 3B may be performed respectively at the transmitting device and receiving device. Examples of the transmitter and receiver are shown in FIGS. 1 and 2 as the wireless devices and/or server. Other examples may include wireline devices, such as optical fiber connected devices. In addition, FIG. 4 illustrates a block diagram of a transmitter/receiver pair in accordance with some embodiments.

As above, although concealing the communication signal may be desirable, typical LPI/LPD approaches may not work well for many current types of communications. Traditional encryption, too, may have inherent weaknesses, such as safe and secure key distribution, or vulnerability to side-channel attacks that allow saved encrypted data to be decrypted at a later date. To overcome these issues, in some embodiments the binary bit level content may be prevented from being captured and saved through the use of modulation encryption. If the ciphermodulated waveform is demodulated without the appropriate modulation key, the bit level data content may be rendered unrecoverable.

Figure 4:
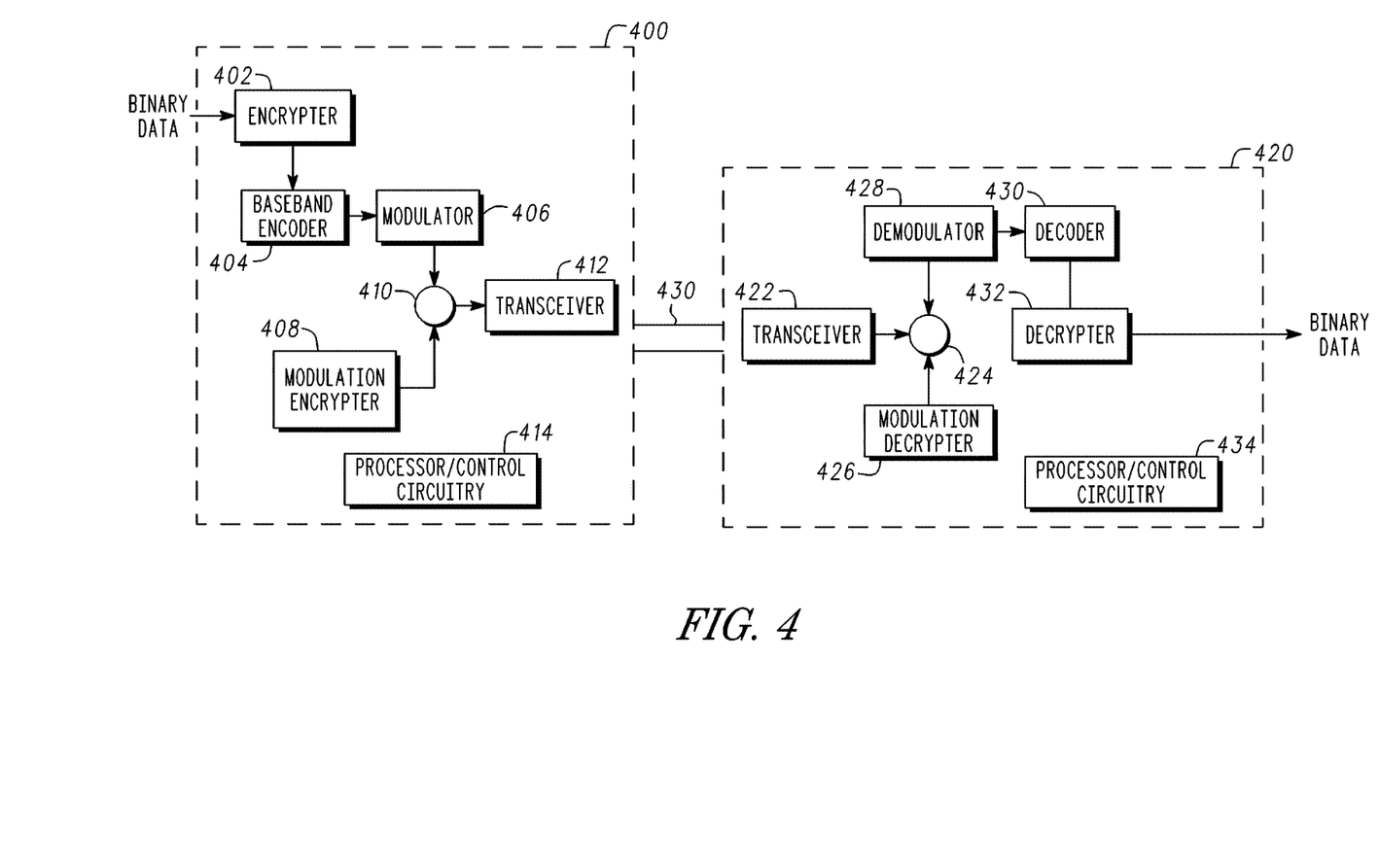
FIG. 4 illustrates a block diagram of a transmitter/receiver pair in accordance with some embodiments.

In operation 302 of FIG. 3A in the transmitter 400 shown in FIG. 4, plaintext (i.e. cleartext used as input to encryption) that has been generated at the transmitter 400 may be encrypted at an encrypter 402 to form ciphertext. In some embodiments, the key used to form the ciphertext may comprise a static key and/or a time-dependent key. The plaintext may be textual data, audio data or visual data generated by a user, for example, and may contain content desired to be received at one or more receivers. The plaintext may be converted to ciphertext using a predetermined encryption algorithm known to both the transmitting wireless device and the receiving wireless device and using a predetermined encryption key. The encryption algorithm may be time-invariant (non-time varying) and may be selected from one of a number of different types of algorithms including hashing algorithms such as Message Digest 5 (MD5) and Secure Hashing Algorithm (SHA), symmetric algorithms such as Data Encryption Standard (DES), Advanced Encryption Standard (AES), and International Data Encryption Algorithm (IDEA), and asymmetric algo-

TABLE 1

| | Traditional Encryption | | Modulated Waveform Encryption |
|---|---|---|---|
| Cleartext | Readable data transmitted or stored unencrypted -refers specifically to unencrypted binary bits. | Clearmodulation | A carrier signal that has been modified as determined by the modulation format to carry baseband information. Typically referred to as simply the modulation. |
| Plaintext | The binary bit input to an encryption algorithm. Cleartext becomes plaintext when used as in input to an encryption algorithm. | Plainmodulation | The modulated signal used as an input to modulated waveform encryption. The plainmodulation is the clearmodulation when used as an input to waveform encryption. |
| Ciphertext | The encrypted output from an encryption algorithm - an encrypted steam of binary bits. | Ciphermodulation | The plainmodulation signal with modified amplitude or phase based on a known operation determined by the modulation key. The output of modulated waveform encryption. |
| Encryption Key | Information that determines the how the plaintext gets converted to ciphertext or how it is converted back. | Modulation Key | A time-varying signal that determines how the plainmodulation gets converted to, and back from, a ciphermodulation. | rithms such as RSA and Diffie-Hellman. The encryption algorithm used may not vary in time such that the key is time-invariant. The key for the encryption may be transmitted to the receiver concurrently with the encrypted data on a different channel or prior to or after data transmission.

In some embodiments, quantum key distribution (QKD) may be used to safely distribute the key used to create the ciphertext. QKD, however, if implemented through the use of new network architecture and hardware, may be environmentally sensitive and may not address the ability to capture and save the transmitted data. In fact, parallel research on quantum computers promise to be able to crack encryption keys at unprecedented rates, making sensitive data accessible in significantly less time than is currently possible. Thus, the use of QKD alone may still engender several above vulnerabilities.

The ciphertext may then be encoded at operation 304 by an encoder 404 using a predetermined line coding scheme to produce a baseband waveform. The encoding scheme may include, for example, Alternate Mark Inversion (AMI) Return-to-Zero (RZ), Non-Return-to-Zero (NRZ), Manchester Coding, Pulse-Position Modulation (PPM), among others.

The baseband waveform may then be modulated onto a carrier frequency at operation 308 by modulator 406 using a predetermined modulation scheme to produce the plainmodulation. The modulation scheme may include, for example, Quadrature Amplitude Modulation (QAM), phase-shift keying, frequency-shift keying or amplitude-shift keying, among others. One or more oscillators (such as a voltage controlled oscillator or laser) configured to provide the carrier signal, mixers configured to mix a plainmodulation with the modulation key, filters, such as low pass or band pass filters, configured to filter the mixed signal, digital-to-analog converters to convert the digital signal to an analog signal for transmission, polarizers for optical transmission and modulators to convert the digital signals to radio frequencies may be provided.

At operation 310, a modulated waveform encryption may be applied to the plainmodulation to create a ciphermodulated waveform. As shown in FIG. 4, the modulated signal (plainmodulation) generated at operation 308 may be provided to a combiner 410, where the plainmodulation may be encrypted with a real-time (i.e., time-varying) modulation key waveform generated by a modulation encrypter 408.

In some embodiments, modulated waveform encryption may be performed using a physical process (such as mixing the plainmodulated signal with the modulation key, XOR gates etc. . . . ). In some embodiments, modulated waveform encryption may be implemented algorithmically whereby the conversion of plainmodulation to ciphermodulation is accomplished by a software program with the resultant magnitude or phase information being used to drive a physical modulation to create the actual ciphermodulated waveform.

Modulated waveform encryption may provide an additional layer of security in which the modulation key, itself may vary with time. Specifically, in some embodiments, the modulation key may vary after a predetermined amount of time, such as 1 µs or 1 ms, has passed independent of the amount of plainmodulation encrypted or after a predetermined number of symbols having been encrypted independent of the time. In some embodiments, information regarding the number of symbols remaining prior to the modulation key varying may be transmitted to the receiver prior to initiation of transmission of the content to the receiver. In some embodiments, the phase of the modulation key may shift and thus real-time knowledge of the modulation key at the time of encryption may be used by the receiver. This may be especially useful in optical transmissions in which, after detection by a photoreceiver and conversion to an electrical signal, phase information of the incoming signal may be irrevocably lost and unable to be reconstructed. If the ciphermodulation is detected without the appropriate modulation key, the binary bit data content may be rendered unrecoverable.

Although modulated waveform encryption described herein may change the amplitude or phase of the plainmodulation, in some embodiments the remapping may not change the symbol represented by the ciphermodulation when measured by a standard receiver. In other embodiments, the remapping described herein may change the amplitude or phase of the plainmodulation as well as changing the symbol represented by the ciphermodulation when measured by a standard receiver.

At operation 312, the ciphermodulation may be transmitted from the transmitter 400 to a receiver 420. The ciphermodulation may use any type of transmission medium, including, for example, wireless or wired transmission or, as illustrated in FIG. 4, an optical fiber 430. Thus, the transmitter 400 may contain, for example, an RF or optical transceiver 412. The transmitter 400 may contain one or more processors and other control circuitry 414 that control the various components of the transmitter 400. In some embodiments, the processor and control circuitry 414 may replace some of the components of the transmitter 400, such as the encrypter 402 or modulation encrypter 408.

In some embodiments, optical transmissions may be used to carry communication signals along a communication channel between the transmitter 400 and receiver 420. The optical communications may be carried, for example, through a single mode or multi-mode optical fiber 430. Optical communication modulation approaches may include phase modulation, in which the phase of the electric field of an optical carrier is modulated. Phase modulation may be essentially undetectable by direct detection due to the frequency of the light traversing the optical fiber, and the limitation that optical photodetectors are 'square-law' detectors that are sensitive only to light intensity. Moreover, once the detection process is undertaken by such optical detectors, all information about the phase of the light being measured is irrevocably lost. Thus, detecting the ciphermodulation without using the modulation key (and coherent detection, where applicable) may destroy the binary bit level information content of the transmission.

In order to recover transmitted information that is encoded in the optical phase, a coherent optical detection process may be used. For example, a continuous wave (CW) laser may be used as a reference Local Oscillator (LO) and mixed with the transmitted optical signal to measure the time-varying phase changes of the communication signal relative to the LO signal. By using a differential detection approach, in-phase and quadrature components of the communication signal may be able to be recovered.

In practice, lasers in electronic equipment may not be able to be kept at exactly the same frequency. Thus, digital signal processing techniques may be used to make the information recoverable. Thus, in some embodiments, instead of using a laser at a constant amplitude and phase, a waveform with well-controlled but variable amplitude and phase may be mixed with the incoming optical signal before detection.

As shown in FIG. 4, the modulation key waveform may be produced by a real-time modulation encrypter and decrypter disposed respectively within the transmitter and receiver. In other embodiments, the real-time modulation key waveform may be generated remotely and transmitted to either or both the transmitter and receiver. For example, the real-time modulated key may be generated by the transmitter and sent to the receiver or generated by the receiver and transmitted to the transmitter. No matter its origin, the real-time modulation key waveform may modify the signal measured by the optical 'square-law' detector. A similar embodiment may be used for RF detection and demodulation where the LO reference signal is a modulation key that modifies the amplitude or phase of a ciphermodulated waveform.

The ciphermodulation may be transmitted through a network, such that shown in FIG. 1. In other embodiments, the ciphermodulation may be transmitted directly between the transmitting device and receiving device. At operation 322, the ciphermodulation may be received at a receiving device 420. The receiving device 420 may contain, for example, an RF or optical transceiver/photodetector 422 that is configured to receive the transmission at the transmission wavelength. In some embodiments, the demodulation may occur during photodetection for coherent modulation communication formats.

At operation 324, a modulation key waveform may be applied to the ciphermodulation to decrypt the ciphermodulation and regenerate the clearmodulation. A modulation decrypter 426 may generate a modulation key waveform, which may be combined at the combiner 424 to measure the time-varying phase change of the time-varying modulation key waveform relative to the ciphermodulation. As shown in FIG. 4, the combining the ciphermodulation and modulation key yields the recovered clearmodulation.

If, for example, the modulation key waveform varies in time (e.g., the amplitude or phase is time-varying), the manner in which the variation occurs may be transmitted along with ciphermodulation. The variation may be transmitted as a signal to which modulated waveform encryption has not yet been applied, e.g., as clearmodulation, at a predetermined position in the transmission. The predetermined position may be at the beginning or end of the transmission or a number of symbols into the transmission that is either established or itself varies in a known manner, such as being dependent on the time or number of symbols of the transmission. In some embodiments, the variation may be transmitted concurrently (or non-concurrently) with the ciphermodulation, but on another channel to which the receiver is able to tune. In some embodiments, the transmitter and receiver may use time-derived information to generate the ciphermodulation and recover the clearwaveform, and thus a timestamp of generation of the cipherwaveform may be used by the receiver. The timestamp of transmission may also be used if the variation does not change between generation and transmission. The variation may be constant throughout the transmission or may vary during the transmission.

The clearmodulation obtained from the application of the modulation key waveform at operation 324 may then be demodulated at operation 326 by a demodulator 428. The demodulator 428 may use a coherent demodulation scheme and may be similar to that applied by the modulator 406 of the transmitting device 400. The baseband signal may be regenerated by the demodulation and a decoder 430 may recover the ciphertext.

At operation 332, a decryption algorithm may be applied to the regenerated ciphertext at a decrypter 432 to form the cleartext. The decryption algorithm applied by the decrypter 430 may be symmetric to the encryption algorithm applied at the transceiver 400. The cleartext may then be processed and stored by the receiving device 420 to display or otherwise play or provide the information contained by the cleartext to a user. The receiving device 420 may contain one or more processors and other control circuitry 434 that controls the various components of the receiving device 420, such as by parsing timing information of the received signal and providing the information to the modulation decrypter 426. In some embodiments, the processor and control circuitry 434 may replace some of the components of the receiving device 420, such as the decrypter 430 or modulation decrypter 426.

Figure 5:
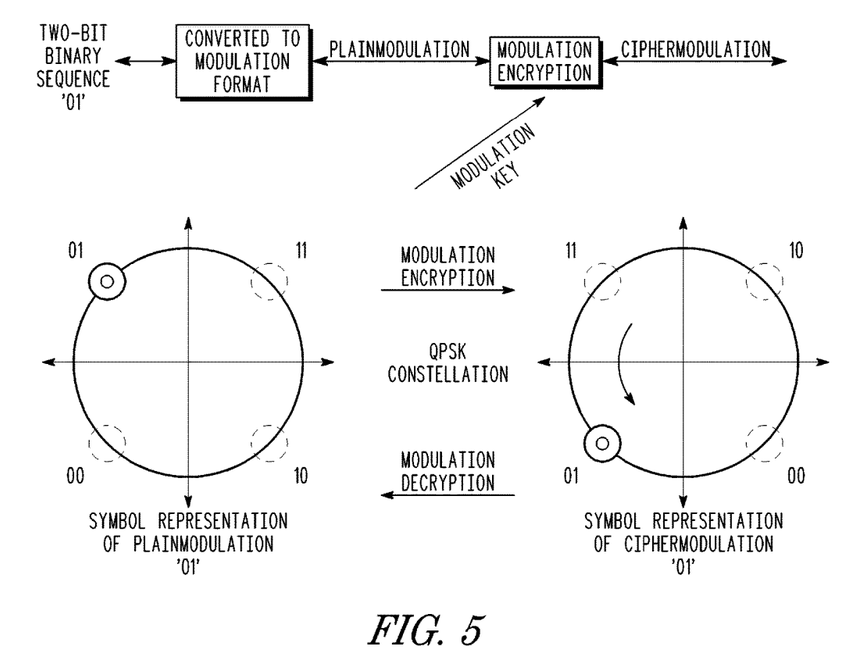
FIG. 5 illustrates an example of modulation encryption based on transmission of data using Quadrature Phase Shift Keying (QPSK) in accordance with some embodiments.

FIG. 5 illustrates an example of modulation encryption based on transmission of data using Quadrature Phase Shift Keying (QPSK). The two-bit binary sequence, 01, is represented in the traditional constellation diagram by a symbol in the upper left hand quadrant (Quadrant II). This position is represented by a plainmodulated waveform with specific magnitude and phase. In order to implement modulation encryption, a modulation key may be used to modify the plainmodulation.

The pattern of the modulation key may be known or knowable by, as well as generated by both the transmitter and receiver. The modulation key may be generated from a pseudorandom sequence (generated by a known seed) or a truly random sequence, either of which may be performed in real-time, or may be from a predetermined list having one or more values generated and stored at the different devices (transmitter and receiver). In the specific case illustrated, the modulation key may cause the phase of the plainmodulation to be changed, while keeping the magnitude constant. The change in phase, related to the particular modulation key may generate a ciphermodulated waveform whose symbol representation in the QPSK constellation falls in lower left hand quadrant (Quadrant III), and may effectively rotate the constellation by π/2.

Figure 6:
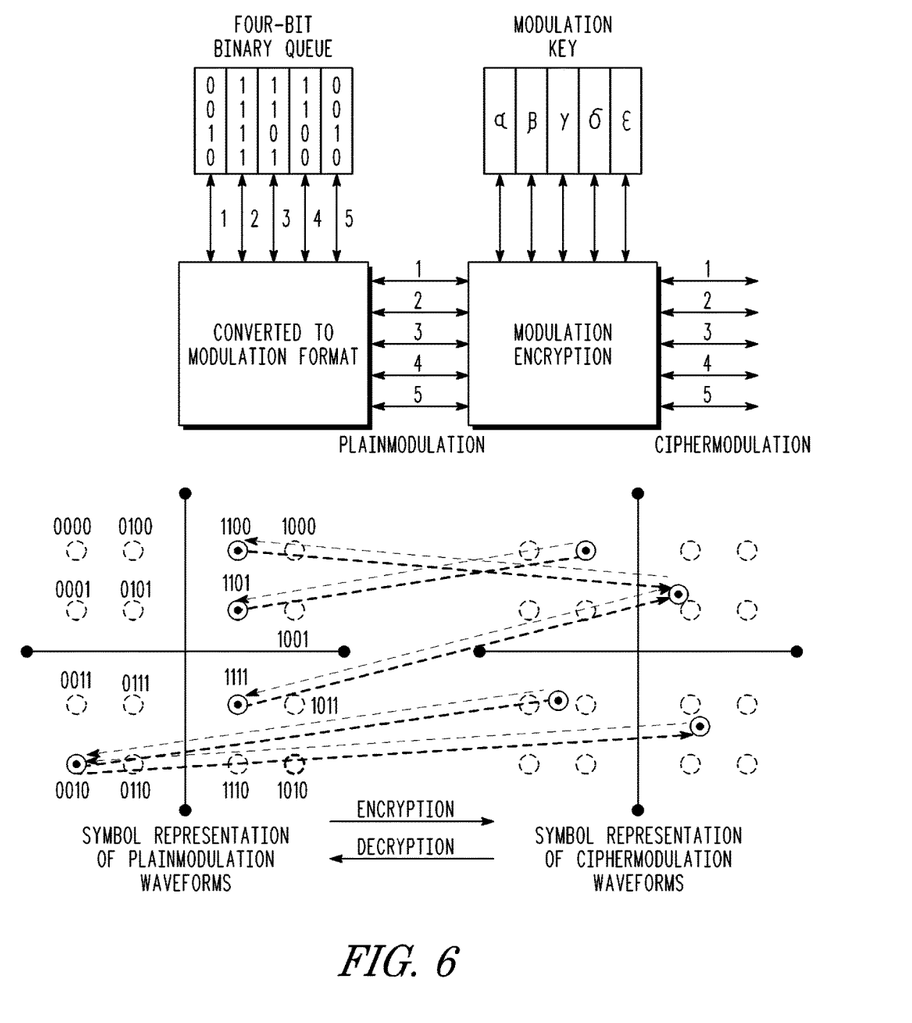
FIG. 6 illustrates an example using modulation encryption on a 16-QAM format in accordance with some embodiments.

The ciphermodulation may then be transmitted to its intended receiver, where the reverse process may take place. A copy of the modulation key waveform may be either generated by the receiver or received from the transmitter or another network entity in a separate communication, using the same or a different communication path (e.g., over the same network connection or through different network connections such as the internet and a virtual private network). The modulation key may be applied by the authorized receiver to recover the correct two-bit binary sequence, 01. In situations where coherent demodulation is required, the modulation key may be applied prior to detection, such that any real-time information in the cipherwaveform (e.g., phase information) may be retained. An unauthorized receiver may implement the standard demodulation technique, without the waveform key and recover an incorrect two-bit binary sequence, 00. In some embodiments, modulation encryption may be used to remap the magnitude and phase of plainwaveforms so that symbols represented by the cipherwaveform are no longer coincident with the expected locations of symbols in the constellation diagram. FIG. 6 shows an example using modulation encryption on a 16-QAM format. There is a four-bit binary queue, which may hold successive binary entries that are modulated into 16-QAM, 4 bits at a time. The modulation may generate a plainwaveform with a magnitude and phase for each of the symbols that align to the symbols shown in the standard constellation diagram.

In order to protect the data from being intercepted while in transit, an individual modulation key (one each), may be applied successively to the plainwaveform representation of the bit sequences in the queue. The key waveforms (modulation keys), α, β, γ, δ, ε may modify the magnitude and phase of plainwaveforms 1, 2, 3, 4, 5 and create cipherwaveforms 1, 2, 3, 4, 5, respectively. In some embodiments the number of modulation keys may be different than the number of cipherwaveforms. The cipherwaveforms may be transmitted in succession as they are created. In some embodiments, each modulation key may be a dynamic reference signal configured to change between periods of encryption of the plainmodulation. The encryption period may be relatively short, e.g., such that the modulation key changes between successive symbols, or longer, such that the modulation key changes between a plurality of symbols. In some embodiments, each modulation key may be generated by a different local oscillator.

The bottom right-hand corner of FIG. 6 shows the symbol representation in the constellation diagram. The locations of expected symbols are shown in the plot, which correspond to a 16-QAM constellation. There were two plainmodulated waveforms representations of '0010.' The modulation key α generated a ciphermodulated waveform with magnitude and phase that moved the symbol associated with the first plainmodulation to Quadrant III of the constellation diagram. The modulation key ε, shifted the second symbol representation of the plainmodulation '0010' to Quadrant IV. Neither location is coincident with an expected symbol in the constellation, and it is clear that since two different modulation keys were used, two different ciphermodulated waveforms resulted, each with a different symbol representation. The plainmodulation for the second bit sequence in the queue, '1111', was modulation encrypted by modulation key β, yielding a ciphermodulation with magnitude and phase that falls in Quadrant I of the constellation, but which is also non-coincident with an expected symbol location. Modulation encryption may alter the magnitude and phase of each plainmodulation differently, based on the modulation key. Thus, as shown in the example of FIG. 6, ciphermodulation 4 (representing the fourth bit sequence in the queue, '1100') is the same as ciphermodulation 2 (representing the second bit sequence in the queue, '1111'). This is to say that even though the ciphermodulated waveforms are associated with a different bit sequence, their symbol representations are the same. Similarly, as shown plainmodulation 3 (representing the third bit sequence in the queue, '1101') is modified by modulation key γ, which generates a ciphermodulation with magnitude and phase corresponding with the symbol representation of '0100' in Quadrant I of a standard 16-QAM constellation diagram, even though the bit sequence it actually represents is '1101.'

FIG. 6 shows that the process of modulation encryption is a reversible process for authorized receivers with the appropriate modulation keys. Each ciphermodulation may be reassociated with its respective modulation key to decrypt the ciphermodulation and eventually recover the binary bit sequence. For unauthorized receivers, the symbols may be misinterpreted, as in the example of ciphermodulation 3, or otherwise misread. In all cases, an unauthorized receiver, without the appropriate modulation keys, may be unable to capture the protected data content.

In communication systems where coherent receivers are required and detection is made before the modulation key is applied, or when a discrete symbol location is estimated and saved, instead of the actual magnitude and phase of the cipherwaveform, information content in the transmission may be rendered unrecoverable, even if the modulation keys are captured or discovered at a later time. This feature differs from traditional encryption approaches where ciphertext may be converted to cleartext anytime in the future as long as the decryption key is obtained.

It should be noted that the two cited example reference remapping of plainwaveform one-to-one onto cipherwaveforms, but the concept allows for grouping or combining of multiple symbols (several plainwaveforms) into a single ciphersymbol or spreading a single plainwaveform across several ciphersymbols as part of the modulated encryption process.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A communication device comprising:
an encryption circuit configured to waveform encrypt a plainmodulated waveform containing user content using a modulation key waveform to form a ciphermodulation, the modulation key waveform comprising a dynamic reference signal configured to change between periods of encryption of the plainmodulated waveform, the modulation key waveform configured to change after a predetermined number of symbols having been encrypted, the change of the modulation key waveform independent of time for transmission of the predetermined number of symbols; and
a transmitter configured to transmit to one or more receivers:
information regarding a number of symbols remaining prior to the modulation key waveform changing, and
after transmission of the information, the ciphermodulation.

2. The communication device of claim 1, wherein: the dynamic reference signal is based on a predetermined list, a pseudorandom or a random process.

3. The communication device of claim 1, wherein: the encryption circuit is configured to waveform encrypt the plainmodulation by adjusting at least one of a magnitude and phase of the plainmodulation to form the ciphermodulation.

4. The communication device of claim 1, wherein: the encryption circuit is configured to waveform encrypt the plainmodulation such that a symbol representation of the modulated plainmodulation is the same as a corresponding symbol representation of the ciphermodulation when measured by a standard receiver.

5. The communication device of claim 1, wherein: the encryption circuit is configured to waveform encrypt the plainmodulation such that a symbol representation of the plainmodulation is different than a corresponding symbol representation of the ciphermodulation when measured by a standard receiver.

6. The communication device of claim 1, wherein: the transceiver is configured to transmit to the receiver a manner in which the dynamic reference signal is configured to change in time, the transmission occurring at least one of prior to transmission of the ciphermodulation and concurrent with transmission of the ciphermodulation at least one of on a different channel than transmission of the ciphermodulation and using a different communication path.

7. The communication device of claim 1, wherein: the encryption circuit is configured to waveform encrypt the plainmodulation based on transmission of data using Quadrature Phase Shift Keying (QPSK), the modulation key waveform configured to alter a phase of the plainmodulation while keeping a magnitude of the plainmodulation constant such that a QPSK constellation is rotated in providing symbol representation.

8. The communication device of claim 1, wherein: the encryption circuit is configured to select among a plurality of modulation key waveforms such that different modulation key waveforms are able to be applied to successive plainmodulations representing bit sequences in a queue, the modulation key waveforms configured to independently modify a magnitude and phase of plainmodulations to create different ciphermodulations.

9. The communication device of claim 8, wherein: the modulation key waveforms encrypt the plainmodulations to move a symbol representation of each of the plainmodulations within a Quadrature Amplitude Modulation (QAM) constellation such that a location of the symbol representation of the plainmodulation in the QAM constellation and a location of a symbol representation of the ciphermodulation in the QAM constellation are different.

10. The communication device of claim 9, wherein: at least one of the symbol representations of the ciphermodulations in the QAM constellation is in a location non-coincident with an expected symbol in the QAM constellation.

11. The communication device of claim 9, wherein: locations of a plurality of the symbol representations of different ciphermodulations are coincident with each other in the QAM constellation such that different locations of different plainmodulations are represented at the same location in the QAM constellation by the respective ciphermodulations.

12. The communication device of claim 1, wherein: the encryption circuit is configured to encrypt multiple plainmodulations into a single ciphermodulation.

13. The communication device of claim 1, wherein: the encryption circuit is configured to encrypt a single modulated plainmodulation across a plurality of ciphermodulations.

14. A communication system comprising:
a transmitting communication device comprising:
an encryption circuit configured to waveform encrypt a plainmodulation containing user content using a modulation key waveform to form a ciphermodulation, the modulation key waveform comprising a dynamic reference signal configured to change between periods of encryption of the plainmodulation, the modulation key waveform comprising a dynamic reference signal configured to change between periods of encryption of the plainmodulation and configured to adjust at least one of a magnitude and phase of the plainmodulation to form the ciphermodulation, the modulation key waveform configured to change after a predetermined number of symbols having been encrypted, the change of the modulation key waveform independent of time for transmission of the predetermined number of symbols, and
a transceiver configured to transmit the ciphermodulation after transmission of information regarding a number of symbols remaining prior to the modulation key waveform changing; and
a receiving communication device comprising: a transceiver configured to receive the ciphermodulation; and
a decryption circuit configured to waveform decrypt the ciphermodulation into the plainmodulation using the modulation key waveform applied prior to detection in a coherence receiver configuration.

15. The communication system of claim 14 wherein: the transceiver is configured to transmit to the receiver a manner in which the dynamic reference signal is configured to change in time, the transmission occurring at least one of prior to transmission of the ciphermodulation and concurrent with transmission of the ciphermodulation at least one of on a different channel than transmission of the ciphermodulation and using a different communication path.

16. The communication system of claim 14, wherein: the encryption circuit is configured to select among a plurality of modulation key waveforms such that different modulation key waveforms are able to be applied to successive modulated plainmodulations, and the modulation key waveforms encrypt the plainmodulations to move a symbol representation of each of the plainmodulations within a Quadrature Amplitude Modulation (QAM) constellation such that a location of the symbol representation of the plainmodulation in the QAM constellation and a location of a symbol representation of the ciphermodulation in the QAM constellation are different.

17. The communication system of claim 16, wherein at least one of:
   at least one of the symbol representations of the ciphermodulation in the QAM constellation is in a location non-coincident with an expected symbol in the QAM constellation, and locations of a plurality of the symbol representations of different ciphermodulations are coincident with each other in the QAM constellation such that different locations of different modulated plainmodulations are represented at the same location in the QAM constellation by the respective ciphermodulated waveforms.

18. A method of providing secure electronic content comprising:
   selecting one of a plurality of modulation key waveforms, the modulation key waveform reselected after a predetermined number of symbols having been encrypted, the change of the modulation key waveform independent of time for transmission of the predetermined number of symbols;
   encrypting a plainmodulation containing user content using the selected modulation key waveform to form a ciphermodulation, the ciphermodulation having at least one of a different magnitude and phase of the plainmodulation such that a symbol representation of the plainmodulation within a Quadrature Amplitude Modulation (QAM) constellation is different from a symbol representation of the ciphermodulation in the QAM constellation;
   transmitting the ciphermodulation after transmitting information regarding a number of symbols remaining prior to the modulation key waveform changing;
   selecting another of the modulation key waveforms prior to at least one of transmission of a predetermined number of plainmodulations and a predetermined time.

19. The method of claim 18, further comprising at least one of: transmitting at least one of the selected modulation key waveform and a manner in which the selected modulation key waveform is configured to change with time to enable coherent demodulation of the ciphermodulation to be performed, and encrypting at least one plainmodulation to form at least one ciphermodulation such that at least one of: a plurality of plainmodulations are encrypted into a single ciphermodulation and a single plainmodulation is encrypted across a plurality of ciphermodulations.

20. The communication device of claim 1, wherein: the number of symbols indicated by the information as remaining prior to the modulation key waveform changing is different for different transmissions.

21. The communication device of claim 1, wherein: the modulation key waveform changes between successive symbols of the ciphermodulation.

* * * * *

UNITED STATES PATENT AND TRADEMARK OFFICE
CERTIFICATE OF CORRECTION

PATENT NO. : 10,243,735 B2
APPLICATION NO. : 14/950575
DATED : March 26, 2019
INVENTOR(S) : Kowalevicz et al.

It is certified that error appears in the above-identified patent and that said Letters Patent is hereby corrected as shown below:

On the Title Page

In item (57), in Column 2, Line 10, delete "encypted" and insert --encrypted-- therefor In item (57), in Column 2, Line 20, delete "encypted" and insert --encrypted-- therefor In the Specification In Column 9, Line 67, delete "430" and insert --432-- therefor In Column 10, Line 1, delete "400." and insert --422.-- therefor In Column 10, Line 11, delete "430" and insert --432-- therefor In Column 10, Line 36, delete "n/2." and insert --π/2.-- therefor In the Claims In Column 13, Line 29, in Claim 2, after "wherein:", insert --¶--

In Column 13, Line 32, in Claim 3, after "wherein:", insert --¶--

In Column 13, Line 36, in Claim 4, after "wherein:", insert --¶--

In Column 13, Line 42, in Claim 5, after "wherein:", insert --¶--

In Column 13, Line 48, in Claim 6, after "wherein:", insert --¶--

In Column 13, Line 56, in Claim 7, after "wherein:", insert --¶--

Signed and Sealed this
Nineteenth Day of January, 2021

Andrei Iancu
*Director of the United States Patent and Trademark Office*

CERTIFICATE OF CORRECTION (continued)
U.S. Pat. No. 10,243,735 B2

In Column 13, Line 64, in Claim 8, after "wherein:", insert --¶--

In Column 14, Line 5, in Claim 9, after "wherein:", insert --¶--

In Column 14, Line 13, in Claim 10, after "wherein:", insert --¶--

In Column 14, Line 18, in Claim 11, after "wherein:", insert --¶--

In Column 14, Line 25, in Claim 12, after "wherein:", insert --¶--

In Column 14, Line 28, in Claim 13, after "wherein:", insert --¶--

In Column 14, Line 54, in Claim 14, after "comprising:", insert --¶--

In Column 14, Line 60, in Claim 15, after "wherein:", insert --¶--

In Column 15, Line 1, in Claim 16, after "wherein:", insert --¶--

In Column 16, Line 17, in Claim 19, after "of:", insert --¶--

In Column 16, Line 21, in Claim 19, after "and", insert --¶--

In Column 16, Line 26, in Claim 20, after "wherein:", insert --¶--

In Column 16, Line 30, in Claim 21, after "wherein:", insert --¶--